(12) United States Patent
Boor

(10) Patent No.: US 8,153,045 B2
(45) Date of Patent: Apr. 10, 2012

(54) COLOR VARIATION CONTROL PROCESS FOR MOLDING PLASTIC AND COMPOSITE MULTI-COLOR ARTICLES

(76) Inventor: Billibob J. Boor, Hortonville, WI (US)

( * ) Notice: Subject to any disclaimer, the term of this patent is extended or adjusted under 35 U.S.C. 154(b) by 1190 days.

(21) Appl. No.: 11/217,051

(22) Filed: Aug. 31, 2005

(65) Prior Publication Data

US 2007/0045887 A1    Mar. 1, 2007

(51) Int. Cl.
*B29C 39/12* (2006.01)

(52) U.S. Cl. .................. 264/245; 264/241; 264/239

(58) Field of Classification Search .................. 264/245, 264/241, 239
See application file for complete search history.

(56) References Cited

U.S. PATENT DOCUMENTS

| | | | | |
|---|---|---|---|---|
| 5,223,191 | A | * | 6/1993 | Tatsuno et al. ............... 264/40.1 |
| 5,866,639 | A | | 2/1999 | Dorchester et al. |
| 5,989,003 | A | * | 11/1999 | Gray et al. .................... 425/130 |
| 6,136,235 | A | * | 10/2000 | Saito et al. ................... 264/40.1 |
| 6,572,802 | B1 | | 6/2003 | Austin |

FOREIGN PATENT DOCUMENTS

| | | |
|---|---|---|
| DE | 29822004 U1 | 6/1999 |
| EP | 0473944 A2 | 3/1992 |
| WO | WO9720674 A1 | 6/1997 |
| WO | WO98/23433 A1 | 6/1998 |

\* cited by examiner

*Primary Examiner* — Yogendra Gupta
*Assistant Examiner* — John Robitaille
(74) *Attorney, Agent, or Firm* — Boyle Fredrickson S.C.

(57) ABSTRACT

A process to effect random color variation in multi-color molded articles includes feeding individual colors to molding equipment in a pre-established sequence and manner that prevents substantial mixing of the colors, and at pre-established ratios in relation to a non-integer multiple of the volume associated with the molded article.

5 Claims, 3 Drawing Sheets

COLOR VARIATION CONTROL PROCESS FOR MOLDING PLASTIC AND COMPOSITE MULTI-COLOR ARTICLES

CROSS-REFERENCES TO RELATED APPLICATIONS

Not Applicable.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates generally to molding processes, molding control processes, and molded parts.

More particularly, the invention relates to a color variation and color sequencing control process for molding multi-colored plastic and composite articles, and which, while suitable for molding many multi-colored parts, is particularly useful in molding parts where a degree of controlled randomness is desired such as to simulate the natural coloring and/or marbling of slate, marble and other rocks, or the color grains of wood materials.

2. Background Art

Many processes are known for molding multi-colored plastic and composite articles. Two such processes are described briefly below, along with certain known drawbacks and disadvantages of each process.

Liquid Color Injection. This is a process where an organic color liquid is directly injected into the screw section of an injection molding press. This causes color streaking and swirling on the final product. Some of the disadvantages of this process include the following: It is not possible to consistently obtain a realistic look simulative of, for example, naturally occurring slate, because of the unnatural swirling and unnatural color transition. The organic colors do not hold up well in the sunlight, and tend to fade and discolor under extended UV exposure. It is also not possible to achieve an adequate control level for the process to allow true natural look with the above-noted desired randomness. Only one product can be run through the injection molding machine at a time, so the standard clean out and shutdown of a machine are needed to switch colors. In addition, the concentrates of the organic color liquid are high in cost, resulting in a higher cost molded product.

Color Concentrates/Streaker Pellets. With this process a concentrated color is used to streak the material to be molded. This colored material is added at the hopper and melts at different temperatures in the barrel causing streaking or blooming effects. Some of the disadvantages of this process include the following: As with the liquid color injection process, it is not possible to consistently obtain a realistic look simulative of, for example, naturally occurring slate, because of the unnatural swirling and unnatural color transition. Again, it is not possible to achieve an adequate control level to allow true natural look with the above-noted desired randomness. And again, only one product can be run at a time, so the standard clean out and shutdown of a machine are needed to switch colors. In addition, the streakers are high in cost, resulting in a higher cost molded product.

Numerous other processes are known for molding multi-colored plastic and composite articles. However, none of the prior processes eliminate the above-described drawbacks for molding parts suggestive of naturally occurring materials with random marbling or like effects.

SUMMARY OF THE INVENTION

The general objective of the invention is to provide a new and unique color variation and color sequencing control process for molding multi-colored plastic and composite articles. The process control is established according to parameters of the articles to be molded and the desired color variation.

A more detailed objective of the invention is to provide a new and unique process that controls feeding of different colored materials to molding equipment in a sequenced manner that results in predictably random color distribution in the molded articles. The process generally involves delivery of different colored molding materials with virtually no mixing of colors, except for controlled mixing to obtain additional colors in the molded article.

The color variation control process is not limited for use with a specific type of molding, but is useful with all types of molding processes, including but not limited to: blow molding, high pressure injection molding, low pressure injection molding, extrusion molding, roll forming, and compression molding.

The color variation control process is also applicable in relation to all kinds of multi-colored molded articles, and enables creation of unique color combinations and sequences in such articles. In one implementation, the process enables production of composite roofing tiles that are sequenced with colored marbling to simulate slate tiles. Utilizing the color variation control process enables molding of such articles with realistic and highly desired color blends and presentations that are not currently available with current molding techniques. The colors can be sequenced with marbling for realistic representation of other rock materials such as marble, or to create realistic color grains that simulate the appearance of various wood materials. The result is product coloring heretofore unavailable, with random color variation that is uniquely controlled during the molding process.

The color variation control process is further useful in relation to molding with many different types of plastics, rubbers and composite materials. Examples of suitable materials include (but are not limited to) HDPE, rubber, polypropylene, and vinyl, as well as PVC, polystyrene, latex. These can be run in pure form, blends, or composite form, such as, for example, HDPE composite that also contains rubber. Composite forms, as used herein, will generally include polymer mixed with a filler. Fillers can be by-products from other processes, such as wood dust, paper sludge, rice hulls, and other undesirable materials to make a useful material. Fillers may also be specified to impart certain desirable characteristics in the composite such as enhanced strength, durability or flame resistance.

The color variation control process of the present invention achieves the following benefits and advantages as compared with current molding technologies. (a) Random color patterns in the molded article are under full control of the color variation process and therefore can be made predictably random. This enables molding of parts with a true natural look. (b) Unlike single colored articles, mixing batches or lots of streakers with prior processes to obtain multi-colored articles can cause color related quality complaints such as blotching or non-realistic color blends or swirls instead of, for example, marbled veins in simulated slate. The color variation control process of the present invention helps to eliminate these types of problems by already having a color breakup function built into the process, by sequencing between colors being fed to the molding equipment instead of laying out solid colors like most current molding processes. (c) The process allows for variations in the coloring to still be used due to the built-in color break up. With prior processes, these products might otherwise be scrapped. However, with the controlled randomness from the process of the invention, a natural shift in the colors add to the look of randomness as a plus, verses having a solid shift colors with prior processes and such variations look like a defect because it sticks out as being different. (d) More realistic, true-to-life coloring can be achieved in molded articles that is not currently available with present techniques. (e) The coloring result in the molded article is accomplished without special additives to the molded materials, and without the associated equipment, as required in some current molding techniques. (f) The color sequences can be changed "on the fly", both manually or automatically, to reduce or eliminate molding equipment down time during such changes with prior processes. (g) With, for example, a three color setup, limitless color sequences can be achieved with no down time, and changes can be made with the touch of a button on the feeding system controls. (h) Colors can alternately be mixed evenly to create different solid colors such as black and terra-cotta to create burgundy-brown, again with no down time for the molding equipment. (i) The color variation control process results in cost savings as compared with current techniques because a less costly coloring material can be used, and because the amount of scrap product from the process (i.e., those articles that do not meet the repetitive patterns or randomness of the desired product) is minimal verses having to change over raw materials and cleaning the machine out for each different product. Many times when changing over colors with prior processes, a machine will have idle time resulting in lost production time. With the color variation process of the invention, all of these items are reduced as compared with prior processes. (j) In addition, the coloring material used in the present invention can be an oxide material which has excellent UV resistance so that the molded products will maintain their color integrity over long term exposure to sunlight.

These and other aspects, objectives and advantages of the invention will become more apparent from the following detailed description when taken in conjunction with the accompanying drawings.

Briefly, the color variation control process involves feeding different colored materials to molding equipment in a sequence and manner that prevents substantial mixing of the colors and that achieves predictable or controllable random coloration in molded articles. The process utilizes one or more control modules, and material handling equipment that is capable of feeding different colored molding materials to molding equipment with minimal mixing between colors.

Implementation of the color variation control process for a multi-colored molded article involves: specifying the number of colors to be used in the molded article, the approximate ratio of the colors in the molded article, and the sequence of the colors in the molded article; determining the total volume to fill in order to mold the article (including any areas to be filled and then trimmed or removed from the molded article); modifying the total mold volume by a factor to obtain a non-integer multiple thereof; and repetitively feeding the individual colors to the molding equipment in the desired sequence at the desired ratios in relation to the modified total volume. The result will be production of multiple multi-colored molded articles with controlled random coloration.

Figure 1:
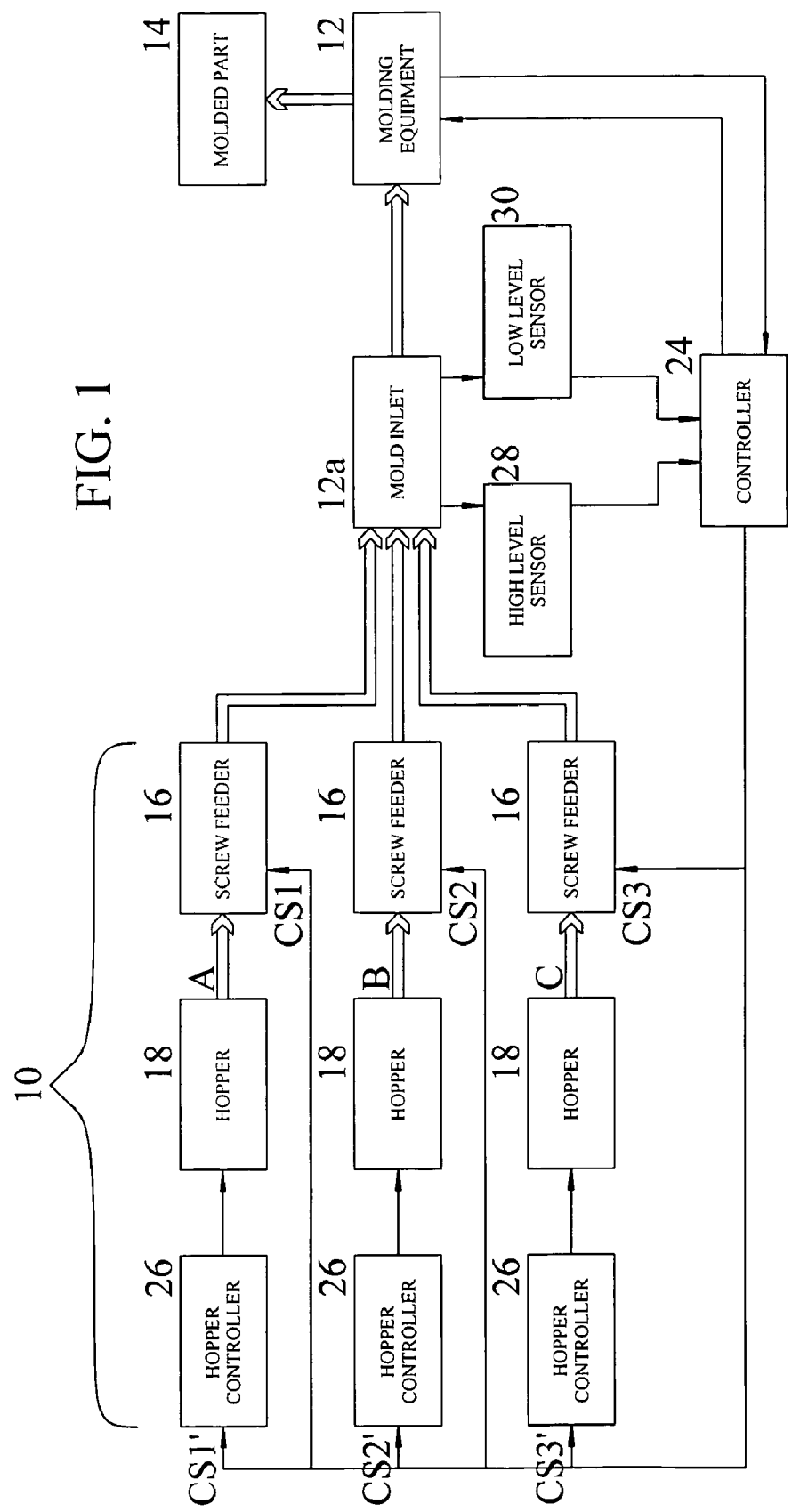
FIG. 1 is a flowchart illustrating a preferred implementation of the color variation control process in accordance with the invention as utilized with conventional molding equipment.

While the invention is susceptible of various modifications and alternative constructions, a certain embodiment has been shown in the drawings and described in detail below. It should be understood, however, that there is no intention to limit the invention to the specific form disclosed, but on the contrary, the intention is to cover all modifications, alternative constructions, alternative processes, and equivalents falling within the spirit and scope of the invention.

DETAILED DESCRIPTION OF THE INVENTION

For purposes of illustration, one implementation of a color variation control process in accordance with the invention is set forth in a flowchart in FIG. 1 in which operative communications (e.g., electrical, optical, digital, etc.) between components are designated with single-line connections, and the flow of material is designated with double-lines. As previously noted, the color variation control process involves feeding different colored materials to molding equipment in a sequence and manner that prevents substantial mixing of the colors and that achieves predictable or controllable random coloration in molded articles.

Figure 2:
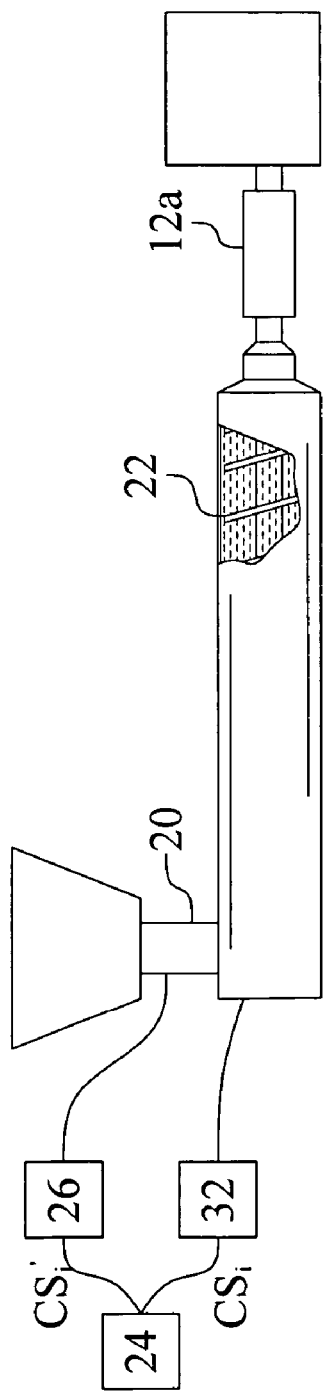
FIG. 2 is a side view of one feeder and certain associated components identified in the flowchart in FIG. 1.

Referring to FIG. 1, the molding setup shown includes a feeding system 10 to feed different colored materials to molding equipment 12, such as (but not limited to) an injection molding machine, that produces multi-colored molded articles 14 with a controlled randomness. In this instance, the feeding system includes three screw-drive feeders 16 for running up to three colored materials A, B and C in the molding process. In general, a feeder includes a hopper 18, and a material loader 20 (see FIG. 2) that controls outflow of material from the hopper. A screw drive 22, which is typically a standard part of an injection molding machine, moves the material forward towards the injection mold inlet 12a as it simultaneously heats the material. The number of feeders in a system will establish the maximum number of colors that can be run without mixing of colors. Operation of the feeding system is controlled by a process control module 24 in cooperation with the operation of the molding equipment.

The feeding system 10 and control module 24 are configured to feed the moldable colored materials A, B and C in a pre-established sequence from the individual feeders 16 to the mold inlet 12a as the molding equipment 12 requires material to fill a mold cavity for molding of the article 14. This basic operational characteristic of the color variation control process is in contrast to a conventional molding process with a single hopper that is filled with base material and concentrated color that are blended together, or where two or more colored materials are simultaneously fed to the mold inlet. By feeding the molding equipment from the individual feeders as the molding equipment needs material, blending of the different colored materials A, B and C that would normally occur in a conventional material feeding system can be eliminated.

Upon process initiation, the control module 24 sends a control signal (CS1) to run a first color (e.g., material A) through its associated feeder 16. The first color runs for its designated time (or until a pre-established volume of material has been fed) or until the material accumulates and trips a high level sensor 28 in the mold inlet 12a. If the high level sensor is tripped, the process control module stops the feeding system and lets the molding machine consume material the from the mold inlet. Once that material is substantially consumed, a low level sensor 30 in the mold inlet is tripped indicating to the process controller to start feeding additional material. When all of the pre-established volume of material A has been fed, the process control module 24 stops running the first material, and sends a control signal (e.g., CS2 or CS3) to initiate running the next color in the sequence. However, the next color does not start until the preceding color is consumed enough to trip the low level sensor. This keeps the material mixing at the mold equipment to a minimum.

In preferred embodiments, the feeders 16 are outfitted with individual drive motors and control modules 32 for individual speed calibration of the screw drive 22, and the hoppers 18 are provided with individual control modules 26 for the material loaders 20. The process control module 24 communicates with the feeder control modules 32 via control signals $CS_i'$ (where i=1-3) to control the speed of the feeders, with the loaders control modules 26 via control signals $CS_i$ to control the dropping of material from the hoppers, and otherwise to coordinate the timing and operation of the components utilized in the color variation control process in conjunction with the operation of the molding equipment 12. The individual hopper control modules 26 enable the process to be further fine tuned by precisely controlling the volume of each colored material to be run through the process. The various control modules can be implemented in individual control units or in modules of, for example, a single process control unit.

In one preferred implementation of the invention, the coloring material used is an oxide material which has excellent UV resistance so that the molded products will maintain their color integrity over long term exposure to sunlight.

By way of example only, a suitable, low cost, readily available Genisis KBMS-10MRA unit has been successfully used as an overall process controller with Pro Rate hoppers, feeders and feed controllers. There are, of course, many control units commercially available, or that could be designed by those skilled in the art that would meet the operational requirements of the invention.

To aid in the color variation control process, a molding machine may be fitted with a non-standard deep cut low shear screw 22 to cause the material to be moved forward with very little mixing through the simultaneous heating process in the screw drive. The mixing level can also be controlled to a low condition by controlling the rotating screw speed and operating pressure under which the material is injected into the mold. In one prototype unit, there were 3 colors used: terra cotta, green, and gray. With three colors, seven different multi-color products are easily run in production without having to stop and clean the machine.

As previously noted, the color variation control process also involves feeding the different colored materials in a manner that achieves predictable or controllable random coloration in molded articles. This will, of course, depend on the number and desired ratios of colors in the molded article, as well as other factors. In particular, carrying out the color variation control process involves the following:

1) specify (establish, select, etc.):
   a) the number of colors ("N") to be used in the molded article,
   b) the approximate ratio ("R1→N") of the colors in the molded article,
   c) the sequence ("S1→N") of the colors in the molded article;
2) determine (calculate, compute, estimate, etc.) the total volume ("V") to fill in order to mold the article, i.e., the total mold volume, including any areas to be filled and then trimmed or removed from the molded product;
3) modify (revise, calculate, etc.) the total mold volume by a factor "F" to obtain a non-integer multiple (e.g., "V*=V*F" or V*="V+(V*F)") thereof; and
4) repetitively feed the individual colors to the molding equipment in the desired sequence, in a manner that maintains substantial color integrity of the different colors (as discussed above), and at approximately the desired ratio but in relation to (i.e., as a function of) the modified total mold volume ("R1→N*=f(R1→N,V*)") to produce multiple molded articles.

Thus, once the volume of the mold is known, the color variation process involves the following variable or controllable parameters in the material feeding and molding process:

1) specify colors: N (number), $R_{1 \rightarrow N}$ (ratios), and $S_{1 \rightarrow N}$ (sequence);
2) modify V (mold volume) by factor F (non-integer) to obtain V*; and
3) repetitively feed the colors 1→N to the molding equipment in the sequence $S_{1 \rightarrow N}$ and $R_{1 \rightarrow N}*$ in a manner that maintains substantial color integrity of the different colors.

The following examples illustrate implementation of this color variation control process.

Example 1

An article is to be molded with two colors (A, B), sequentially placed, with an approximate ratio of 60% A to 40% B, in a 2 cavity mold with a total volume (including trimmed areas) of 30 pounds of material. The 30-pound volume is modified with a 10% increase factor to obtain a 33-pound modified total volume. The modified mold volume offsets the color placement during production to prevent a noticeable repeating color layout in the finished product. Utilizing the 60% to 40% ratio in relation to the modified total volume, the two colors are fed to the molding equipment as follows: 19.8 lbs of the first color (A), then 13.2 lbs of the second color (B), followed by 19.8 lbs of A and 13.2 lbs of B, repeating this color sequencing through the production run of the molded articles. If the 2 mold cavities are filled in series, this results in a color distribution in the molded articles as follows: 1st article=19.8 A, 10.2 B; 2nd article=3 B, 19.8 A, 7.2 B; 3rd article=6 B, 19.8 A, 4.2 B; and so on until the color distribution of the 1st article is substantially repeated in the 12th article. However, programming in a change to one of the parameters (such as the volume modifying factor or the color distribution ratio) to take effect at or prior to the feeding for the 12th article will prevent even such infrequent repetition in the color patterns of the molded articles.

Example 2

An article is to be produced with the mold and parameters of example 1 except that the color sequence is established with a multiple factor of the ratios of example 1. In this example, the 60%-40% ratio of color sequence is divided into 30% A, 20% B, 30% A, 20% B. In this example, the material is fed to the molding equipment as follows: 9.9 lbs first color (A), 6.6 lbs second color (B), 9.9 lbs A, 6.6 lbs B, and so on. This example will result in molded parts with the same overall color ratios as articles from example 1, but with a more frequent color transition in each article. The same ratios and sequence would result if the 2 cavities of the mold example 1 were filled simultaneously.

Example 3

An article is to be produced with the mold of example 1, but with three colors (A, B, C) utilizing two different color variation ratios. The first ratio will be 20% color A, 20% color B, and 60% color C, followed by a second ratio of 30% color A, 30% color B, and 40% color C, thereafter repeating through the first and second color sequencing ratios. In this instance, the material is fed repetitively to the molding equipment as follows: 6.6 lbs first color (A), 6.6 lbs second color (B), 19.8 lbs third color (C), followed by 9.9 lbs color A, 9.9 lbs color B, 13.2 lbs color C. Utilizing two or more color sequences provides further random color variations in the molded articles.

Example 4

A product is to be produced with the mold of example 1, and the color sequencing of example 2, but the 30-pound total volume is modified with a 10% decrease factor to obtain, a 27-pound modified total volume. The colored material is then repetitively fed to the molding process 8.1 lbs first color (A), 5.4 lbs second color (B), 8.1 lbs first color, 5.4 lbs second color, and so on.

Further modifications of implementation of the color variation control process can be achieved by, for example, intentionally feeding two (or more) colors simultaneously in order to obtain an additional sequenced mixed color without providing such color in a separate feeder. And any of the variable or controllable parameters of the process can be changed manually or "on the fly" by an operator without having to stop the molding process, or changed automatically via being programmed into the process controller to automatically take effect at a specified time (e.g., after running a specified number of articles or processing a specified number of sequence runs) in the process.

Figure 3:
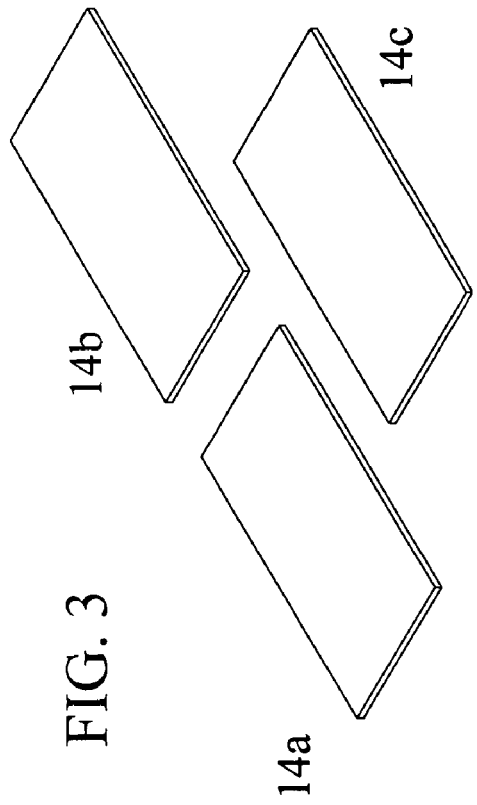
FIG. 3 is a perspective view of three molded articles that are predictably but randomly colored with the color sequencing and color variation control process identified in FIG. 1.

FIG. 3 is a perspective view of three molded articles (14a, 14b, 14c) that are randomly colored as a result of the color sequencing process identified in FIG. 1. In this instance, these are the first three articles from a molding process that fed three colors with a modified mold volume of 10% over the actual mold volume, and color ratios and sequence of 10% A, 60% B, and 30% C.

The molding setup shown in FIG. 1 achieves the desired color variation control with a feeding system that utilizes separate feeders for different colors. Those skilled in the art will recognize that this material handling function can be accomplished in many ways, and common feeding equipment can be used or modified to feed different colored materials in the volumes and ratios specified in the color variation control process without blending the different colors. In this regard, the feeding system is setup to control the input of the different materials and to fed the different materials with minimal mixing. This color transport control can be typically accomplished by specification of new material handling equipment, as in FIG. 1, or by fine-tuning or making physical changes to existing equipment.

The following examples illustrate alternate implementations of material handling suitable for the color variation control process, it being understood that the process will be applicable in relation to other types of feeding systems that can transport the colored material without blending the different colors as they are feed in sequence to the molding equipment.

For example, the material handling and feeding systems of most plastic or rubber extruders are setup to mix the fed materials quickly and efficiently by high speed turning of a barrel and screw design that acts like a blender as it pushes the material forward toward the molding equipment. Carrying out the invention with equipment of this basic type involves controlling the speed of the screw-drive to limit mixing of the different colored materials, and/or by increasing the size and/or angle of the screw in the extruder to not mix but rather to have a "big bite" to move the material forward quickly with limited mixing. The different colored materials would then be fed into the extruder in amounts dictated by the ratios and volumes described above in the color variation control process where the designation of total mold volume is that volume that is fed through the extruder for one molded article, or an integer multiple thereof.

In compression molding, if an extruder is used to produce the multi-colored articles, the techniques in the feeding system described in the preceding paragraph would be applicable. Alternately, if the different colored material is fed to a mold as "crumb" or "solid-type" material as is typically done with thermoset materials, the material feeding system would be modified or controlled to feed the sequenced amounts of material as dictated by the ratios and volumes described.

Figure 4:
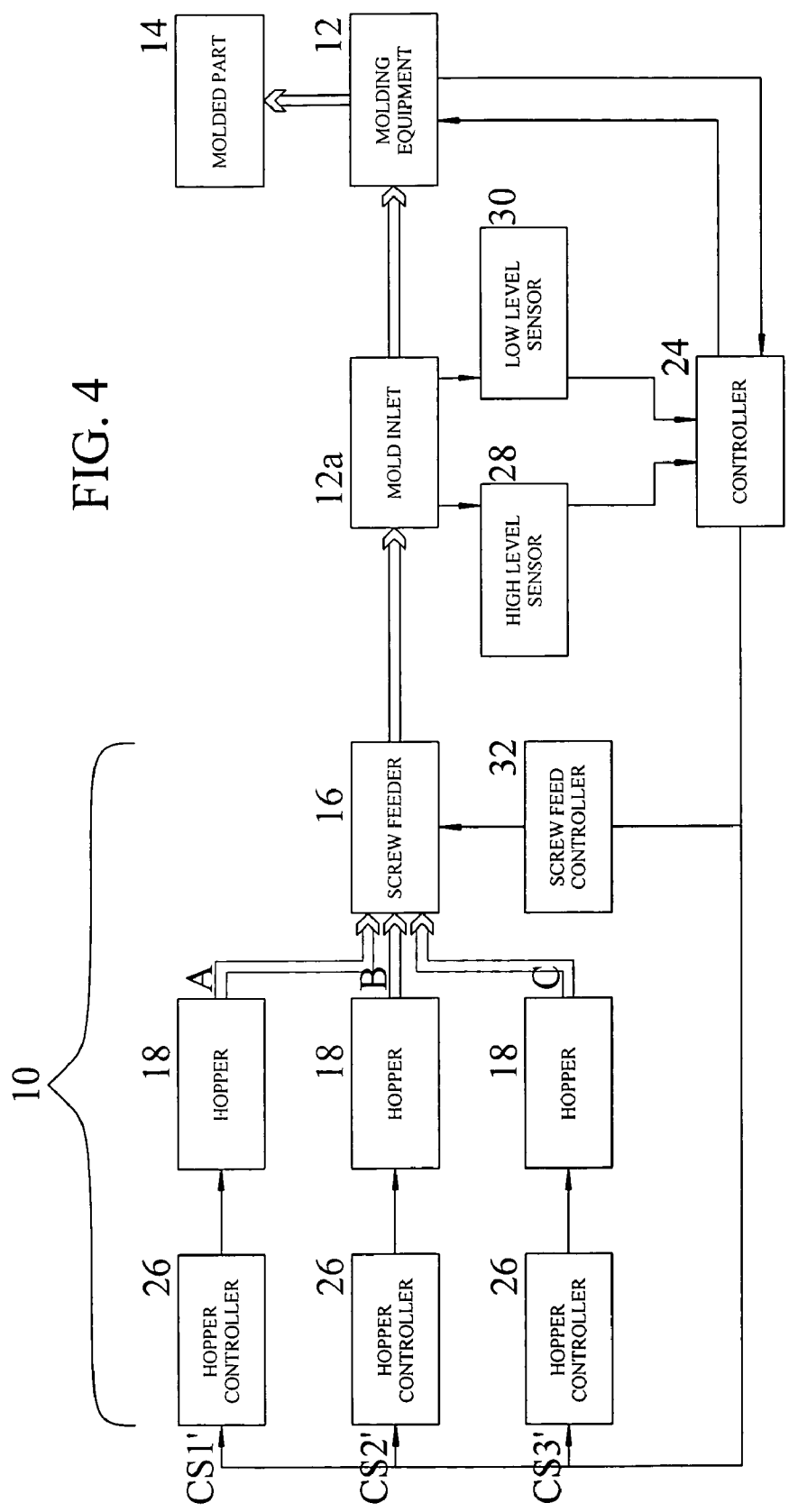
FIG. 4 is a flowchart illustrating an alternate implementation of the color variation control process in accordance with the invention.

As a further example, an alternate implementation of a molding setup is shown in FIG. 4. This system is similar to the system shown in FIG. 1 except that the three hoppers feed into a single feeder 16, and control of material delivery to the feeder is by control signals ($CS_i'$) to the hopper controllers only. Advantages of this alternate system include less cost due to less equipment. Disadvantages of this alternate system include less control over the feeding of the different colors to the mold equipment. This setup also presents the potential for somewhat increased mixing of the colors during transitions between two colors, which for some articles may be desirable.

From the foregoing, it will be clear that the present invention brings to the art a new and unique color variation and color sequencing control process that achieves predictably random color distribution in molding multi-colored plastic and composite articles, and therefore enables obtaining unique color presentations in the molded articles. Variables in the process can be adjusted during molding operations to impart additional control and randomness in the molded articles The formulations, sequencing, etc., in the process can be modified until the desired look is achieved in the molded product. The process is applicable for many types of molding processes, articles and materials, and can be utilized with existing conventional equipment by modifying of fine-tuning the equipment to allow the colored materials to be fed with minimal mixing.

The invention claimed is:
1. A color variation control process for producing plastic and composite multi-colored molded articles with molding equipment, the process comprising:
   a) specifying:
      i) a number of colors to be used in the molded article, ii) approximate ratios of the colors in the molded article, and iii) the sequence of the colors in the molded article;

b) determining a modified total mold volume that is a non-integer multiple of an actual total mold volume associated with the article;

c) feeding the individual colors to the molding equipment in said sequence at said ratios in relation to the modified total mold volume until the volume of individual colors fed to the molding equipment reaches either the modified total mold volume if the modified total mold volume is less than the actual total mold volume, or the actual total mold volume if the modified total mold volume is greater than the actual total mold volume; and then d) one of:

i) repeating said feeding of the individual colors to the molding equipment to fill the actual mold volume if the modified total mold volume is less than the actual total mold volume or to fill a successive actual total mold volume if the modified total mold volume is greater than the actual total mold volume, or ii) either (a) re-specifying one of said number of colors, said approximate ratios or said sequence, or (b) re-determining said modified total mold volume with respect to the actual mold volume; and then repeating said feeding of the individual colors to the molding equipment.

2. The color variation process as defined in claim 1 in which the actual total mold volume associated with the article includes mold areas filled and then trimmed or removed from the molded article.

3. The color variation process as defined in claim 1 in which the molding equipment includes an extruder to mold the article, and the actual total mold volume is that volume fed through the extruder for one molded article or an integer multiple thereof.

4. The color variation process as defined in claim 1 in which said feeding further includes individually controlling the feed of the individual colors to the molding equipment.

5. The color variation process as defined in claim 4 in which the molding equipment includes a common inlet for the individual colors, and in which said feeding further includes sensing the level of each color in the inlet and controlling the feeding of the next color in response thereto to assist is maintaining color integrity between the two colors.

* * * * *